J. Nevison,
Making Staves.
N°. 31,934. Patented Apr. 2, 1861.
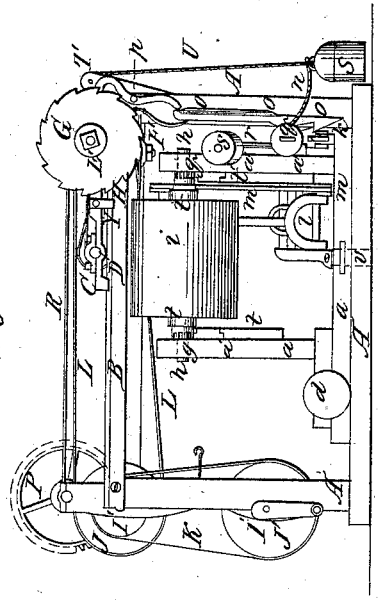
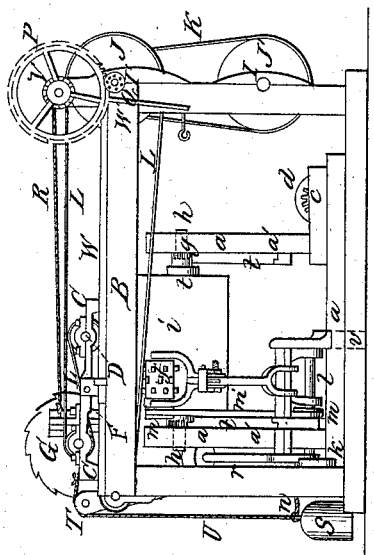
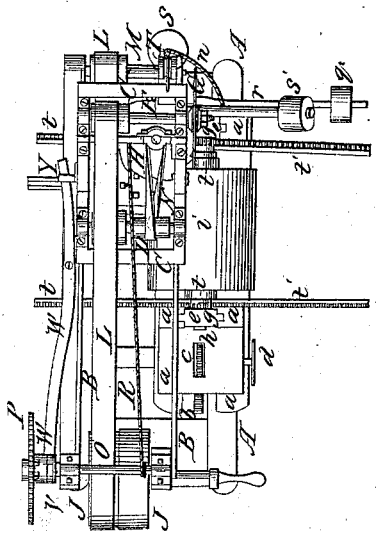
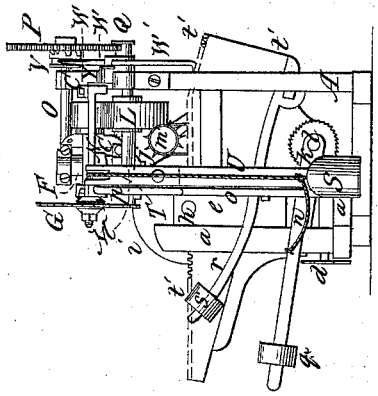
Witnesses:
Inventor:
John Ellis
James Nevison

UNITED STATES PATENT OFFICE.

JAMES NEVISON, OF MORGAN, OHIO, ASSIGNOR TO HIMSELF, AND A. C. WOOD, OF BUFFALO, NEW YORK.

STAVE-MACHINE.

Specification of Letters Patent No. 31,934, dated April 2, 1861.

*To all whom it may concern:*

Be it known that I, J. NEVISON, of Morgan, in the county of Ashtabula and State of Ohio, have invented new and useful Improvements in Stave-Machines; and I do hereby declare that the following is a full and complete description of the construction and operation of the same, reference being had to the accompanying drawings, making a part of this specification, in which—

Figure 1, is a plan view, Fig. 2, is a side view, Fig. 3, is an end view, Fig. 4, is a view of the side opposite from Fig. 2.

Like letters denote like parts in the different views.

My improvement relates to a certain arrangement of a turn table or frame, in connection with gearing and saws worked and fed, and by the means of which, the wind of a log may be brought, in line with the force of the saws, so that the staves shall be straight grained, as they would not be were they cut in line with the length of the log; also in the arrangement of certain levers in combination with a spring and cords by the means of which the bolt is continuously fed to the saws.

A, A, is a frame, running lengthwise along the upper edge of said frame, and parallel with each other on two iron rails B, B, Figs. 1 and 2.

C, C, Fig. 1, is a metallic frame or carriage so constructed, as to slide upon the rails B, B, and in which are secured the three shafts D, E, F. The two shafts D, E, are placed horizontal and parallel to the face of the metallic frame C, C. Upon the end of the shaft E, is hung the circular saw G, seen more distinctly in Fig. 2. The shaft F, that is seen more plainly in Fig. 3, is placed vertical in the metallic frame C, C, at right angles with the two shafts D, E, and at the lower end of which is hung the circular saw H, shown in Figs. 1 and 2. The position of the two saws is such that the plane of their faces is at right angles with each other, while at the same time the teeth are brought in as close relation with each other as possible, without their interfering, hence, the saw C, is made to cut vertically, while the saw H, at the same time cuts horizontally.

Motion is conveyed to the saw G, in the following described manner: At the end of the frame A, A, are two shafts I, I', pulleys J, J', I, being the primary shaft, and I', the secondary; the secondary being connected to the primary by the belt K. From the pulley J extends the broad belt L, Fig. 1, passing over and around the shaft E, back to the shaft F, and thence to the shaft M, at the other end of the frame A, A, and from thence back to the shaft I', and pulley J. The motion of the vertical shaft F, to which is attached, the horizontal saw H, is received from the shaft D by the short belt N.

The feeding of the saws is effected in the following manner: At the end of the frame A, A, Fig. 2, is a shaft O, at the end of which is secured the gear wheel P, which meshes in the spur wheel Q, seen on the shaft I', in Figs. 3, and 4. To the shaft O, is fastened a cord, or rope R, the other end of which, is attached to the metallic frame C, C. As the shaft O, revolves by the means of its gear connection to the shaft I', the rope winds around the shaft, and thereby draws the metallic frame or carriage forward, in the line of the cutting of the saws. The saws and frame are brought back to the original position by the weight S, which is attached to the metallic frame, or carriage, by the cord U, which passes over the pulley T, the weight being sufficient to draw the carriage, or frame back. In order that the carriage may be gigged back without stopping the machine, a sliding clutch V, is placed on the shaft O, on the inner side of the gear wheel P, as seen in Figs. 1, and 3. This clutch, is moved in and out of place, by the curved lever W, attached to the frame A, A, at the point X, Fig. 1. This lever is operated as follows: The bent finger Y, Figs. 1, and 2, is attached, to the metallic carriage or frame C, C, and as the carriage is moved backward, the finger pressing against the outward curve of the lever, throws the clutch at the other end, into contact, with the arms of the wheel P, which causes the shaft O, to revolve, winding up the rope, and drawing the carriage forward. As the carriage or frame approaches the winding shaft O, the finger presses against the other end of the lever, which is also curved outward, and by the action, forces the clutch from its connection with the wheel P, thereby allowing a reverse motion to the shaft, by the weight S attached to the end of the cord U, as before described. The lever W, is jointed in its connection with the arm W′, which is pivoted to the frame at the lower end, the upper end being forked, to work in the groove of the clutch V, as seen at W′, Fig. 1.

Having described the operation of the saws, I now proceed to show how the block, or bolt, is brought to the saws, and continuously fed to the same.

$a$, $a'$, Fig. 2, is an adjustable stand placed upon the base, and partially under the frame A, A. The end $a'$, is secured permanently to the base of the stand, while the end $a$, is so constructed, as to permit it to slide backward and forward upon the base of the stand, according to the length of the bolt, by means of the rack $b$, and pinion $c$, the pinion being worked by the hand wheel $d$. In the end of the stand $a$, $a'$, are placed movable boxes or bearings $e$, $e$, Figs. 1 and 3, which slide upward and downward in grooves, as shown in Fig. 1.

$t$, $t$, Fig. 2, are a pair of dogs.

$g$, $g$, are a pair of pinions, which together with the dogs, are secured, upon the short journals $h$, $h$, which work in the sliding bearings or boxes $e$ $e$, Figs. 1, 2, and 3.

$i$, Figs. 1, 2, and 3, represents the bolt, from which the staves are to be cut, and is placed between the two dogs $t$, $t$, and held securely by them, and placed in relation to the saws, as shown in Figs. 2 and 3. The log is fed to the saws, as follows: As each stave is sawed off of the log, it is again brought to the saws, by the log or bolt being made to revolve with the shaft $h$, $h$, by the feed wheel $j$, Figs. 3 and 4, which is provided with sharp lugs or teeth. This roller is made to revolve by means of the ratchet and pawl lever $k$, Fig. 3, this ratchet and pawl lever being connected with the shaft $f$, upon which is a pulley $m$. The belt $m'$, connects with the pulley $m$, and the pulley $m''$, which last pulley is on the same shaft, with the feed roller, and by which it is operated as described. The feed roller is thus turned in direction toward the bolt. This ratchet lever is raised by the rope $n$, Fig. 3, one end being fastened to the lever, the other being secured to the weight S, as the weight is drawn up by the forward direction of the carriage C, C, the lever by means of the rope $n$, is drawn up with it, to a certain height, and retained there by the notched lever O, Fig. 2. On the return of the carriage the curved lever $p$, is forced back by it, at its upper end, the lower end acting against the upper end of the notched lever O, causes the lever to move back, the lever $k$, being unsupported by the notch, is brought downward by the weight $q$, Fig. 3, causing the pawl and ratchet to turn the shaft $f$, and this in turn by means of the belt, causes the feed roller to turn, carrying with it the log or stave bolt to the saws. The feed roller is pressed strongly against the log by the action of the curved lever $r$, Fig. 3, the weight S′, on the end of the lever giving additional pressure. As the log or bolt decreases in diameter, by the continuous cutting off, of the staves, it is brought upward to the saws, by means of the pinions $g$, $g$, Fig. 1, these pinions working in the slide racks $t'$, $t'$, and revolving in concert, with the log, causes the sliding racks, $u$, $u$, which are wedge shaped to move upward, or forward toward the saw, thereby raising by their increase in width the log or bolt.

The stand $a$, $a$, by being secured at its center only, upon the base of the frame A, A, by the pin or bolt $v$, Fig. 2, allowing it to move horizontally, or giving it a turn table movement. The purpose of this horizontal movement, is to bring the wind of a log or bolt, in a right line with the face of the saw G, so that the grain of the staves shall be straight, hence by this means any log, though its grain may be winding, and thereby unfit for staves, if cut in a line with the face of the log, can be sawn into staves, with the grain running their entire length, by the log being adjusted by the turn table, to the cutting line of the saw.

What I claim as my improvement, and desire to secure by Letters Patent is:

The levers $o$, and $p$, and spring in combination with the cords $u$, and $n$, connected with the saw frame, for the purpose of operating the feed works, as hereinbefore described.

JAMES NEVISON.

Witnesses:
W. H. BURRIDGE,
JOHN ELLIS.